(12) United States Patent
Masui

(10) Patent No.: US 8,207,925 B2
(45) Date of Patent: Jun. 26, 2012

(54) ELECTRO-OPTICAL DEVICE AND ELECTRONIC APPARATUS

(75) Inventor: Junichi Masui, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 539 days.

(21) Appl. No.: 12/470,629

(22) Filed: May 22, 2009

(65) Prior Publication Data
US 2009/0289882 A1    Nov. 26, 2009

(30) Foreign Application Priority Data

May 23, 2008   (JP) ................................ 2008-135164

(51) Int. Cl.
*G09G 3/36* (2006.01)
(52) U.S. Cl. ............................ 345/88; 345/98; 345/100
(58) Field of Classification Search ............ 345/76–111, 345/204, 690
See application file for complete search history.

(56) References Cited

U.S. PATENT DOCUMENTS

| | | | |
|---|---|---|---|
| 2004/0041753 A1* | 3/2004 | Nakanishi | 345/76 |
| 2004/0145556 A1* | 7/2004 | Nakanishi | 345/99 |
| 2006/0022931 A1* | 2/2006 | Yoshimoto | 345/98 |
| 2007/0194211 A1* | 8/2007 | Nagasawa | 250/214 R |

FOREIGN PATENT DOCUMENTS

JP    2007-256909    10/2007

\* cited by examiner

*Primary Examiner* — Amare Mengistu
*Assistant Examiner* — Premal Patel
(74) *Attorney, Agent, or Firm* — Maschoff Gilmore & Israelsen

(57) ABSTRACT

An electro-optical device includes three data lines intersecting a scanning line. Three sampling circuits are aligned in a different direction than the direction in which three (R, G, B) sub pixel units are aligned. An image signal line of one sampling circuit extends across the gate electrode of a transistor in another one of the sampling circuits.

10 Claims, 9 Drawing Sheets

ELECTRO-OPTICAL DEVICE AND ELECTRONIC APPARATUS

The entire disclosure of Japanese Patent Application No. 2008-135164, filed May 23, 2008 is expressly incorporated by reference herein.

BACKGROUND

1. Technical Field

The present invention relates to technical fields of an electro-optical device such as a liquid crystal device capable of performing color display, for example, in a short board-type and an electronic apparatus such as a liquid crystal projector having the electro-optical device.

2. Related Art

In such electro-optical devices, three sub pixel units for RGB (that is, a red color, a green color, and a blue color) that configure one pixel unit are typically aligned in the horizontal direction or direction X within one pixel. The image signals for RGB are simultaneously supplied to three sub pixel units through three data lines that are adjacent to one another. Furthermore, when serial-to-parallel conversion or expansion (phase expansion) is performed for the purpose of increasing the driving frequency or the like, the image signals for RGB are simultaneously supplied to a plurality of the pixel units that is aligned horizontally. In particular, in order to decrease generation of a vertical line in a series of RGB that can easily occur for a case where the image signals are supplied as described above, technology for adding additional capacitors to data lines or source lines has been proposed (see JP-A-2007-256909).

In the electro-optical devices of such type, when the pixel pitch is configured to be small in accordance with a general request for high definition, it is very difficult to form sampling circuits that are disposed for each of RGB on a substrate with being aligned in the horizontal direction with a same pitch. Regarding this problem, first, according to research of an inventor of the invention, a configuration in which three sampling circuits for each of RGB are aligned vertically, that is, the sampling circuits are disposed vertically in three levels may be considered.

However, in electro-optical devices described in "BACKGROUND" or the like, when three-level sampling circuits are formed, unignorable differences among the three-level sampling circuits in a wiring length, a wiring path, parasitic capacitance, and the like are generated. Accordingly, a large or small vertical line is generated not only in a series of RGB but also between the series. In particular, when the sampling circuit is configured by a thin film transistor as is typically performed, unignorable differences between the RGB series in the pushdown amounts of the sources are generated. Accordingly, for example, due to a local direct current component applied to a liquid crystal or an error of setting of the electric potential of an opposing electrode, there is a technical problem that burn-in can easily occur.

SUMMARY

An advantage of some aspects of the invention is that it provides an electro-optical device that is capable of performing high-quality color display for a short board-type and is appropriate to high definition display and an electrical apparatus having the electro-optical device.

According to a first aspect of the invention, there is provided an electro-optical device including: a plurality of scanning lines that extends in a first direction in a pixel area on a substrate, is arranged in a second direction for intersecting the first direction, and is used for sequentially supplying scanning signals; a plurality of data lines that extends in the second direction in the pixel area on the substrate, is arranged in the first direction, and is used for supplying image signals; a plurality of sub pixel units that is disposed on the substrate in correspondence with intersections of the plurality of data lines and the plurality of scanning lines and is in correspondence with R (red color), G (green color), and B (blue color); and a sampling unit for supplying the image signals to three adjacent data lines corresponding to R, G, and B from among the plurality of data lines in which a plurality of three sampling circuits that is arranged in one row in the second direction is arranged in the first direction on the substrate. Each of the three sampling circuits is configured by a thin film transistor and has a gate electrode that extends in the second direction, and each of the three sampling circuits is electrically connected to the source or drain of the thin film transistor, and image signal lines for supplying the image signals before or after sampling have overlapping parts that are overlapped with the gate electrode in the plan view on the substrate and extend in the second direction.

In a case where the above-described electro-optical device of the first aspect is operated, for example, when various signals such as a power signal, a data signal, and a control signal are input and output, the scanning signals are sequentially supplied to the scanning lines, for example, by a built-in driving circuit that is formed on the substrate or a driving circuit externally attached. In parallel with the above-described operation, the image signals are supplied to the data lines, for example, simultaneously for each three adjacent data lines or simultaneously for 3×n (here, n is a natural number equal to or larger than two) data lines by performing serial-to-parallel conversion or expansion. In particular, from three sampling circuits that are arranged in one row in the second direction (that is, typically, the vertical direction or direction Y), image signals of RGB are supplied simultaneously or sequentially to three adjacent data lines corresponding to R, G, and B. By performing input and output of the above-described various signals, in the above-described electro-optical device of the first aspect, an electro-optical operation such as liquid crystal display, EL (Electroluminescence) display, or plasma display is performed in an active matrix. In the above-described electro-optical device, particularly in a pixel area, color filters of RGB (red, green, and blue colors) are typically disposed for each pixel. Accordingly, in each pixel, color display by composition of RGB in units of pixels can be performed by using each pixel unit that is configured by three sub pixel units of RGB. Therefore, color display or full-color display in the short board-type can be performed in the entire pixel area.

In addition, the "pixel area" in descriptions here does not mean the area occupied by each pixel but means an entire area that is constituted by a plurality of pixels that is arranged vertically and horizontally. Thus, the "pixel area" typically means an "image display area".

Here, in the above-described electro-optical device, particularly, three sampling circuits are configured by thin film transistors each having a laminated structure that is the same as or different from that of a thin film transistor as a pixel switching element and have a common gate electrode that extends in the second direction. In addition, the image signal line that is electrically connected to the source or drain of the thin film transistor includes an overlapping part that is overlapped with the gate electrode and extends in the second direction so as to supply an image signal before or after sampling. Accordingly, in the width direction of the image signal line, the image signal line includes the overlapping part, and the width is markedly decreased, compared to a case where any overlapping part is not included in the image signal line and all the image signal lines pass through the side of the thin film transistor. Accordingly, the width of the sampling unit can be decreased in an easy manner in accordance with a decrease in the pixel pitch or the wiring pitch of the data lines. As a result, the sampling unit that is extremely appropriate to high definition display can be realized.

In addition, a difference in parasitic capacitance values among the three adjacent data lines which include a portion contributed by the image signal lines may be increased due to presence of the overlapping part. However, the difference in the parasitic capacitance values can be decreased, for example, by configuring an interlayer distance (for example, the thickness of an interlayer insulating film interposed between the overlapping part and the gate electrode) between the overlapping part and the gate electrode to be large, disposing an electromagnetic shield layer therebetween, or disposing additional capacitors for the data lines and adjusting the capacitance values of the additional capacitors so as to decrease the difference in the parasitic capacitance values, as in an embodiment to be described later. In other words, the occurrence of a vertical line or burnout due to the difference in the parasitic capacitance values can be prevented in advance or decreased in a relatively easy manner.

As described above, according to the above-described electro-optical device, high definition can be easily implemented, and high-quality color display in the short board-type can be performed.

The above-described electro-optical device may further include additional capacitors that are electrically connected to the plurality of data lines. The additional capacitors are configured to have different capacitance values such that a difference of values of parasitic capacitance among the three adjacent data lines including a part contributed by the image signal lines electrically connected to the three adjacent data lines is decreased.

In such a case, even when the difference in the parasitic capacitance values of three adjacent data lines is increased due to presence of the overlapping part, the difference in the parasitic capacitance values can be decreased by adjusting the capacitance values of the additional capacitors that are disposed for the data lines such that the difference in the parasitic capacitance values is decreased. In other words, the occurrence of the vertical line or the burnout due to the difference in the parasitic capacitance values can be prevented in advances or decreased. It is preferable that the additional capacitors are disposed in an area such as a front end or the base of the data lines not for interrupting an electro-optical operation such as a display operation in the pixel area.

In the above-described electro-optical device, the additional capacitors may be built such that one capacitor electrode electrically connected to an opposing electrode disposed on an opposing substrate that forms a pair together with the substrate and other capacitor electrodes disposed on front ends of the plurality of data lines face each other. In addition, the planar sizes of the one capacitor electrode and the other capacitor electrodes may be configured to be different from each other so as to decrease the difference.

In such a case, the additional capacitor can be implemented by using one capacitor electrode that is electrically connected to the opposing electrode of which electric potential falls to an opposing electrode electric potential that is a fixed electric potential typically referred to as LCCOM or the like or a predetermined electric potential that is inverted like a rectangular wave at a constant interval. In this case, by changing only the planar size of the capacitor electrode, the above-described difference in the parasitic capacitor values can be decreased. Accordingly, the required operation for decreasing the difference can be performed in an extremely easy manner.

In the above-described electro-optical device, the plurality of sub pixel units may be sequentially arranged in the first direction in the order of a row corresponding to R that is arranged in one row in the second direction, a row corresponding to G that is arranged in one row in the second direction, and a row corresponding to B that is arranged in one row in the second direction. In such a case, among the three adjacent data lines, one data line corresponding to R is electrically connected to the row corresponding to R, one data line corresponding to G is electrically connected to the row corresponding to G, and one data line corresponding to B is electrically connected to the row corresponding to B, and, among the plurality of sub pixel units, three sub pixel units that are electrically connected to the three adjacent data lines and are adjacent to one another in the first direction configure one pixel unit.

In such a case, while color filters of so called a "stripe arrangement" arranged in the second direction, that is, typically a vertical stripe shape are employed, color display can be performed by using each pixel unit that is constituted by three sub pixel units of RGB as a pixel. In such a case, the occurrence of the vertical line and the burnout are decreased, and accordingly, high-quality color display can be performed. Therefore, high definition implementation can be achieved in an easy manner.

In the above-described electro-optical device the image signal line for one sampling circuit of the three sampling circuits may have a part that passes through a side of the thin film transistor configuring another sampling circuit of the three sampling circuits in the second direction, in the plan view viewed from the substrate.

In such a case, one side of a peripheral area part, in which the sampling circuits connected to three adjacent data lines corresponding to R, G, and B are formed, is disposed closely to the sampling circuits, and the other side of the peripheral area part is disposed closely to a passing part, in the plan view viewed from the substrate. Accordingly, the layout efficiency of the sampling circuits and the image signal lines for the peripheral area part is extremely high.

In the above-described electro-optical device, the sampling units and the image signal lines may be disposed such that the passing parts pass through, as the side, a side that is located on a same side for the three sampling circuits.

In such a case, one side of a peripheral area part, in which three sampling circuits connected to three adjacent data lines corresponding to R, G, and B are formed, is disposed closely to the sampling circuits, and the other side of the peripheral area part is disposed closely to the passing part, in the plan view viewed from the substrate. Accordingly, the layout efficiency of the sampling circuits and the image signal lines for the peripheral area part is extremely high. Furthermore, since a plurality of the peripheral area parts is arranged in the first direction, the layout efficiency of the sampling circuits and the image signal lines is extremely high for the entire peripheral area.

In the above-described electro-optical device of the first aspect, it may be configured that the thin film transistor is configured by laminating a channel area, a semiconductor layer including the source and the drain, a gate insulating film, and the gate electrode on the substrate in the described order, and, on the gate electrode, one interlayer insulating film, and one conductive film that configures the image signal lines are laminated in the described order.

In such a case, on the substrate, a semiconductor layer, a gate insulating film, a gate electrode, one interlayer insulating film that constitute the thin film transistor and one conductive film that constitutes the image signal line are laminated in the described order. Thus, the laminated structure formed on the substrate and the manufacturing process can be simplified, and a very practical advantage can be acquired.

The above-described electro-optical device may further include a relay wiring that is pinched between the one conductive film and the gate electrode through the one interlayer insulating film and another interlayer insulating film, is configured by another conductive film, and relays and connects the image signal lines.

In such a case, an electrically connected state even in a spot in which different image signal lines intersect each other can be build without incurring any problem by using the relay wiring, and accordingly, the electro-optical device has a very practical advantage. The relay wiring may be configured by a conductive metal film or a non-metal conductive material such as conductive polysilicon.

According to a second aspect of the invention, there is provided an electro-optical device including: a plurality of scanning lines that extends in a first direction in a pixel area on a substrate, is arranged in a second direction for intersecting the first direction, and is used for sequentially supplying scanning signals; a plurality of data lines that extends in the second direction in the pixel area on the substrate, is arranged in the first direction, and is used for supplying image signals for R, G, and B; a plurality of sub pixel units that is disposed on the substrate in correspondence with intersections of the plurality of data lines and the plurality of scanning lines and is in correspondence with R (red color), G (green color) and B (blue color); a sampling unit for supplying the image signals to three adjacent data lines corresponding to R, G, and B from among the plurality of data lines in which a plurality of three sampling circuits that is arranged in one row in the second direction is arranged in the first direction on the substrate; and additional capacitors that are electrically connected to the plurality of data lines. The additional capacitors are configured to have different capacitance values such that a difference of values of parasitic capacitance among the three adjacent data lines including a part contributed by the image signal lines electrically connected to the three adjacent data lines is decreased.

In a case where the above-described electro-optical device of the second aspect is operated, as in the above-described electro-optical device of the first aspect, an electro-optical operation such as liquid crystal display, EL (Electroluminescence) display, or plasma display is performed in the active matrix.

Here, according to the above-described electro-optical device of the second aspect, particularly, the additional capacitors are electrically connected to the plurality of data lines. In addition, the additional capacitors have different capacitance values such that a difference in the parasitic capacitance values among three adjacent data lines including a part contributed by the image signal lines is decreased. Accordingly, even when the difference in the parasitic capacitance values among three adjacent data lines is large not to be ignorable, the difference in the parasitic capacitance values can be decreased by adjusting the capacitance values of the additional capacitors disposed for the data lines such that the difference in the parasitic capacitance values is decreased. In other words, the occurrence of the vertical line and the burnout due to the difference in the parasitic values can be prevented in advance or decreased. It is preferable that the additional capacitors are disposed in an area such as the front end or the base of the data lines not for interrupting the electro-optical operation such as a display operation in the pixel area.

As described above, according to the above-described electro-optical device, high-quality color display in the short board-type can be performed with high definition achieved in an easy manner.

According to a third aspect of the invention, there is provided an electronic apparatus including the above-described electro-optical device (including various aspects) for solving the above-described problem.

According to the above-described electronic apparatus, the above-described electro-optical device is included, and therefore, various electronic apparatuses such as a projection-type display apparatus, a television set, a cellular phone, an electronic organizer, a word processor, a viewfinder-type or monitor direct-viewing type video cassette recorder, a workstation, a video phone, a POS terminal, and a touch panel that are capable of performing high-quality image display can be implemented. As examples of the above-described electronic apparatuses, an electrophoretic apparatus such as an electronic paper sheet, and electron discharging apparatus (Field Emission Display and Conduction Electron-Emitter Display), and a display apparatus using the electrophoretic apparatus and the electron discharging apparatus can be implemented.

The operation and other advantages of the invention will be disclosed in description of exemplary embodiments as below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.
Electro-Optical Device A TFT active matrix driving-type liquid crystal device 100 with a driving circuit built-in as an example of an electro-optical device according to an embodiment of the invention will be described.

First, a detailed configuration of the liquid crystal device 100 according to this embodiment will be described with reference to FIGS. 1 and 2. Here, FIG. 1 is a plan view showing the entire configuration of the liquid crystal device 100, and FIG. 2 is a cross-section view taken along line II-II shown in FIG. 1.

Figure 1:
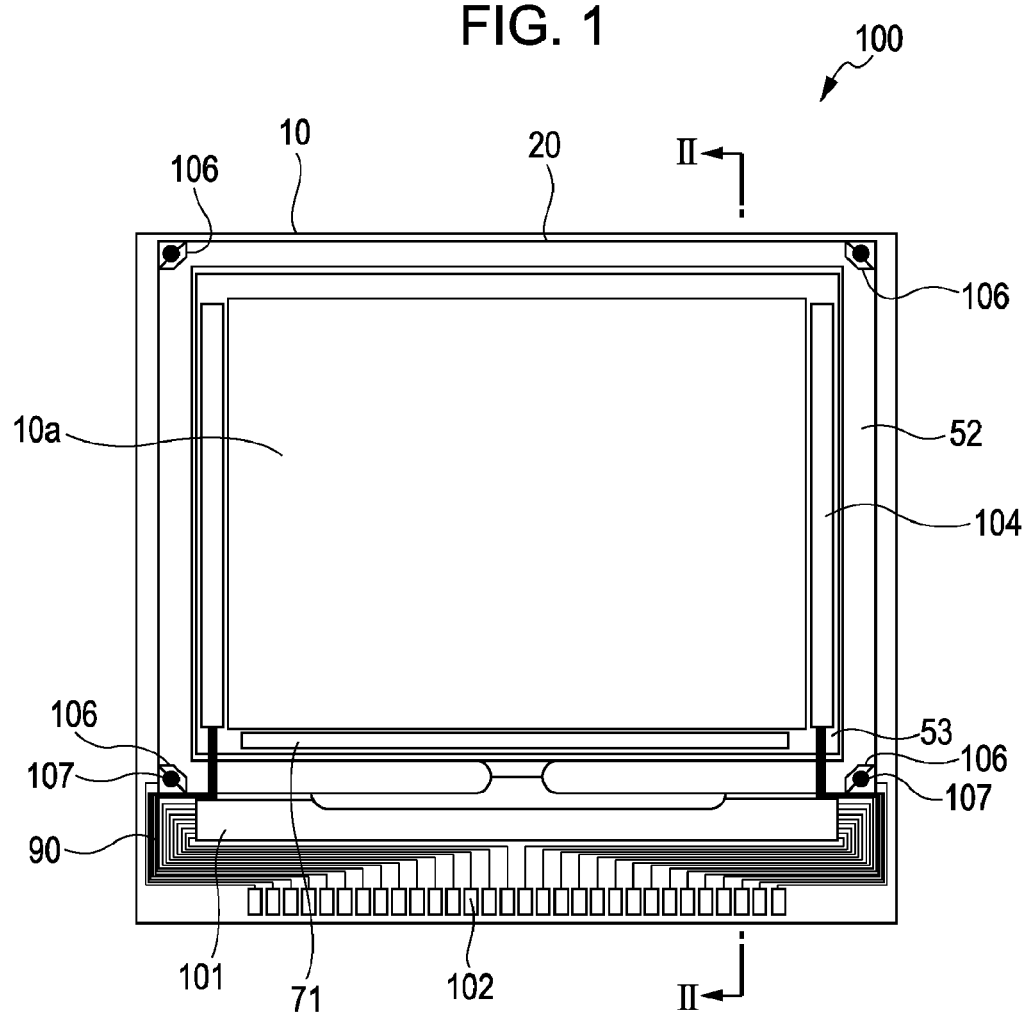
FIG. 1 is a plan view of a liquid crystal device according to an embodiment of the invention.
Figure 2:
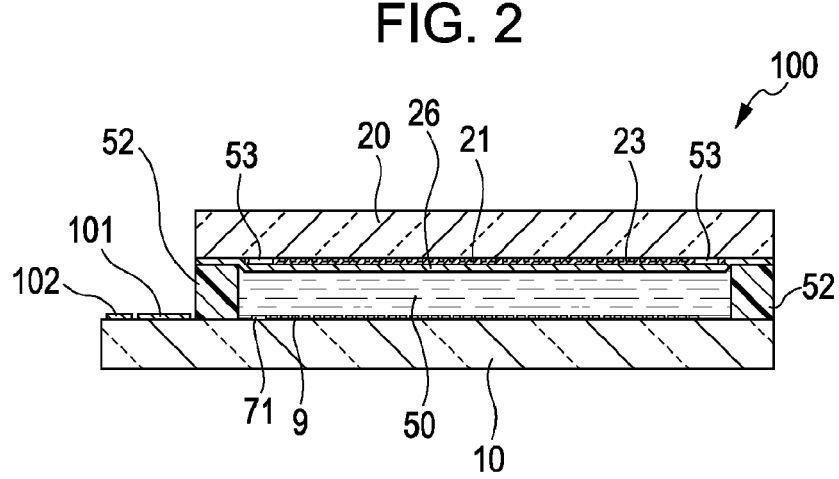
FIG. 2 is a cross-section view taken along line II-II shown in FIG. 1.

As shown in FIGS. 1 and 2, in the electro-optical device according to this embodiment, a TFT array substrate 10 and an opposing substrate 20 are disposed to face each other. Between the TFT array substrate 10 and the opposing substrate 20, a liquid crystal layer 50 is sealed. The liquid crystal layer 50, for example, is formed of a liquid crystal that is formed of a nematic liquid crystal of one type is acquired by mixing nematic liquid crystals of various types. The TFT array substrate 10 and the opposing substrate 20 are bonded together by a sealing material 52 that is disposed in a sealing area located on the periphery of an image display area 10a that is a display area in which a plurality of pixel units is disposed.

The sealing material 52, for example, is formed of an ultraviolet-curable resin, a thermoset resin, or the like that is used for bonding both substrates. In the manufacturing process, after being coated on the TFT array substrate 10, the sealing material 52 is cured by irradiation of ultraviolet rays, application of heat, or the like. In the sealing material 52, a gap material such as glass fiber or glass beads, or the like that is used for forming a gap of a predetermined value between the TFT array substrate 10 and the opposing substrate 20 is dispersed. In addition to or instead of mixing the gap material into the sealing material 52, the gap material may be disposed in an image display area 10a or a peripheral area that is located on the periphery of the image display area 10a.

In parallel with the inner side of the sealing area in which the sealing material 52 is disposed, a casing light shielding film 53 having a light shielding property that defines a frame area of the image display area 10a is disposed on the opposing substrate 20 side. A part of or the whole of the casing light shielding film 53 may be disposed as a built-in light shielding film on the TFT array substrate 10 side. In addition, there is the peripheral area that is located on the periphery of the image display area 10a. In other words, particularly in this embodiment, an area that is located farther than the casing light shielding film 53 from the center of the TFT array substrate 10 is defined as the peripheral area.

In an area of the peripheral area that is located on the outer side of the sealing area in which the sealing material 52 is disposed, a data line driving circuit 101 and a connection terminal 102 are disposed along one side of the TFT array substrate 10. A scanning line driving circuit 104 is disposed along two sides adjacent to the side so as to be covered with the casing light shielding film 53.

On the TFT array substrate 10, in areas facing four corner parts of the opposing substrate 20, vertical conduction terminals 106 that are used for connecting both the substrates with vertical conduction materials 107 are disposed. Accordingly, electrical conduction between the TFT array substrate 10 and the opposing substrate 20 is implemented.

In FIG. 2, on the TFT array substrate 10, a laminated structure, in which a pixel switching TFT and wirings such as a scanning line and a data line are formed, is formed. In the image display area 10a, in an upper layer of the pixel switching TFT and the wirings including the scanning line and the data line, pixel electrodes 9 are disposed in a matrix shape.

In addition, on the TFT array substrate 10, a sampling circuit 71 that samples an image signal of an image signal line and supplies the sampled signal to the data line is formed, in addition to driving circuits such as the data line driving circuit 101 and the scanning line driving circuit 104. In addition, on the TFT array substrate 10, a pre-charge circuit that supplies a pre-charge signal of a predetermined voltage level to a plurality of the data lines, prior to an image signal, a test circuit that tests the quality, the defect, and the like of the electro-optical device in the middle of the manufacturing process or at the shipment, and the like may be formed.

On the other hand, on a face of the opposing substrate 20 that faces the TFT array substrate 10, a color filter 26 is formed to have a predetermined thickness for facing each pixel electrode 9. In this embodiment, one unit pixel is constituted by three sub pixels, and the above-described pixel electrode 9, the pixel switching TFT, the color filter 26, and the like are disposed for each sub pixel. In three sub pixels that constitute the unit pixel, a color filter of a red color (R), a color filter of a green color (G), and a color filter of a blue color (B) are disposed. The color filter of the red color is a color filter that passes light (that is, for example, light having a wavelength of 625 to 740 nm) of the red color. In addition, the color filter of the green color is a color filter that passes light (that is, for example, light having a wavelength of 500 to 565 nm) of the green color, and the color filter of the blue color is a color filter that passes light (that is, for example, light having a wavelength of 450 to 485 nm) of the blue color. The color filters 26 may be disposed on the TFT array substrate 10 side.

In the opposing substrate 20, a light shielding film 23 is formed. The light shielding film 23, for example, is formed of a light shielding metal film or the like and is patterned to have a lattice shape or the like within the image display area 10a on the opposing substrate 20. In addition, on a protection film (not shown) that is formed on the color filter 26 and the light shielding film 23, an opposing electrode 21 formed of a transparent material such as ITO (Indium Tin Oxide) faces a plurality of the pixel electrodes 9 that is formed on the TFT array substrate 10 side so as to be formed in a beta shape.

Figure 3:
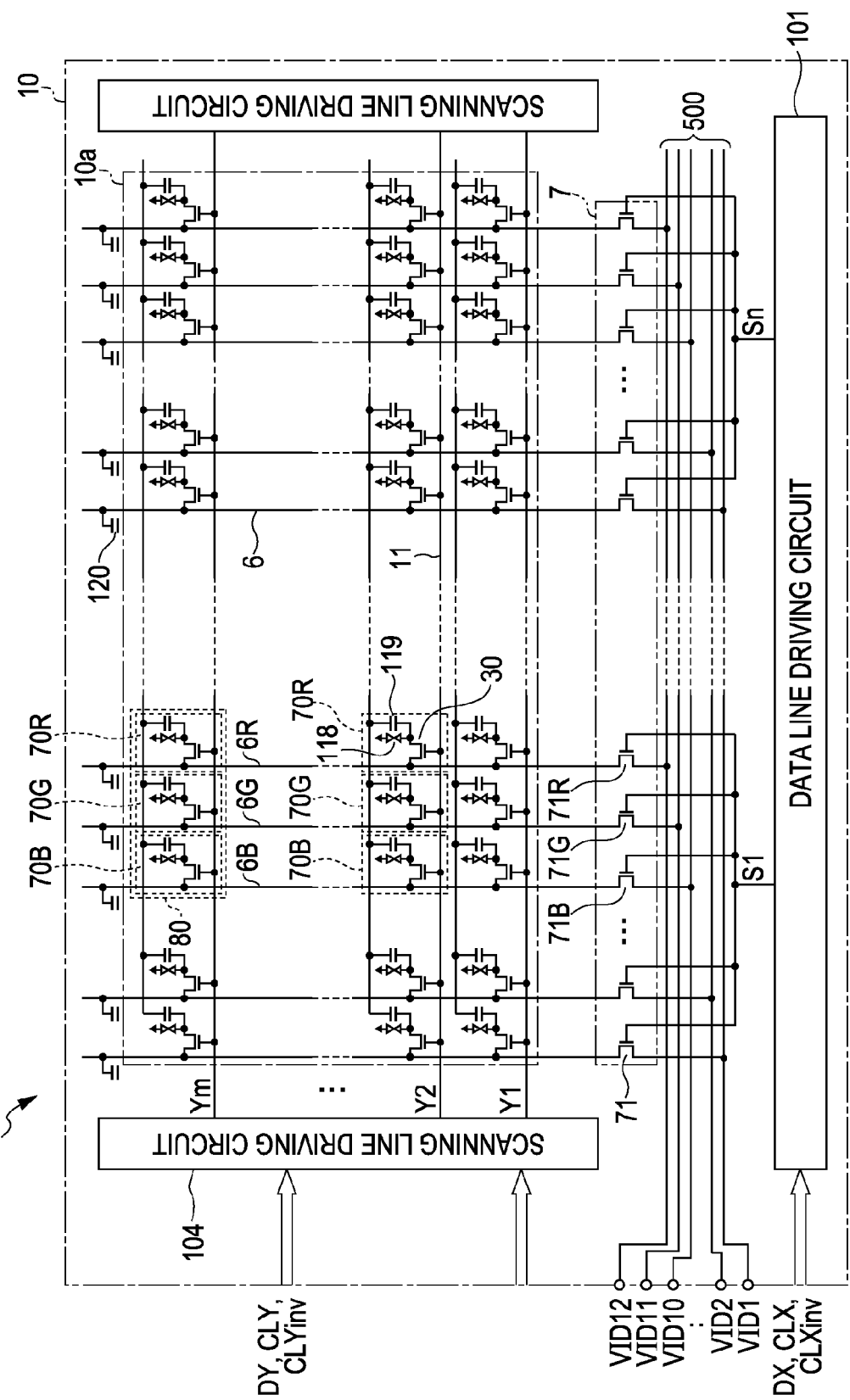
FIG. 3 is a block diagram showing the electrical configuration of a liquid crystal device according to an embodiment of the invention.

Next, the electrical configuration of the liquid crystal device according to this embodiment will be described with reference to FIG. 3. FIG. 3 is a block diagram showing the electrical configuration of the liquid crystal device 100 according to this embodiment.

As shown in FIG. 3, the TFT array substrate 10 of the liquid crystal device 100 includes data lines 6 (that is, data lines 6R, 6G, and 6B) and scanning lines 11 that are wired vertically and horizontally in the image display area 10a. In addition, sub pixels 70 are formed in correspondence with intersections of the data lines 6 and the scanning lines 11. Each sub pixel 70 includes a pixel electrode 9 of a liquid crystal element 118, a TFT 30 for controlling switching of the pixel electrode 9, and a storage capacitor 119. For description in this embodiment, it is assumed that the total number of the scanning lines 11 is m (here, m is a natural number equal to or larger than 2) and the total number of the data lines 6 is n (here, n is a natural number equal to or larger than 2).

In this embodiment, the unit pixel 80 is constituted by three sub pixels 70 (that is, the sub pixels 70R, 70G, and 70B) that are adjacent in a direction (that is, direction X) in which the scanning lines 11 extend. On the opposing substrate 20 side, the color filter 26 of the red color is disposed so as to face the pixel electrode 9 of the sub pixel 70R, the color filter 26 of the green color is disposed so as to face the pixel electrode 9 of the sub pixel 70G, and the color filter 26 of the blue color is disposed so as to face the pixel electrode 9 of the sub pixel 70B. Accordingly, color display of each unit pixel 80 can be performed.

The color filters 26 of the red color, the green color, and the blue color are disposed to have a stripe shape in a direction (that is, direction Y) in which the data lines 6 extend. To one data line 6, the sub pixels 70 of several colors including the red color, the green color, and the blue color are electrically connected. In other words, the sub pixel 70R of the red color is electrically connected to the data line 6R, the sub pixel 70G of the green color is electrically connected to the data line 6G, and the sub pixel 70B of the blue color is electrically connected to the data line 6B.

As shown in FIG. 3, the liquid crystal device 100 includes scanning line driving circuits 104, a data line driving circuit 101, sampling circuits 71, and image signal lines 500, on the periphery of the TFT array substrate 10.

To the scanning line driving circuit 104, a Y clock signal CLY, an inverted Y clock signal CLYinv, and a Y start pulse DY are supplied from an external circuit through an external circuit connection terminal 102 (see FIG. 1). When receiving the Y start pulse DY as input, the scanning line driving circuit 104 sequentially generates and outputs scanning signals Y1 . . . , Ym at timings on the basis of the Y clock signal CLY and the inverted Y clock signal CLYinv.

To the data line driving circuit 101, an X clock signal CLX, an inverted X clock signal CLXinv, and an X start pulse DX are supplied from an external circuit through the external circuit connection terminal 102 (see FIG. 1). When receiving the X start pulse DX as input, the data line driving circuit 101 sequentially generates and outputs sampling signals S1 . . . , Sn at timings on the basis of the X clock signal CLX and the inverted X clock signal CLXinv.

The sampling circuit 71 includes a plurality of thin film transistors 71 (hereinafter, referred to as sampling transistors) that is disposed for each data line 6. Described in more details, the sampling circuit 71 includes a plurality of sampling transistors 71R that is disposed for each data line 6R that is electrically connected to the sub pixel 70R of the red color, a plurality of sampling transistors 71G that is disposed for each data line 6G that is electrically connected to the sub pixel 70G of the green color, and a plurality of sampling transistors 71B that is disposed for each data line 6B that is electrically connected to the sub pixel 70B of the blue color. The layout of the sampling transistors 71R, 71G, and 71B on the TFT array substrate 10 will be described later in detail.

Twelve image signal lines 500 are disposed in this embodiment. Image signals VID1 to VID12 that are acquired from performing serial-to-parallel expansion (or phase expansion) for an image signal of one series into 12 phases by using an external image processing circuit are supplied to the electro-optical device 100 through 12 image signal lines 500. Then, each data line group of n data lines 6, as described below, is sequentially driven, wherein one data line group is constituted by 12 data lines 6 corresponding to the number of the image signal lines 500.

The sampling signals Si (i=1, 2 . . . n) are sequentially supplied from the data line driving circuit 101 to each sampling transistor 71 corresponding to the data line group, and each sampling transistor 71 is switched between the ON state (that is, a conduction state) and the OFF state (that is, a non-conduction state) in accordance with the sampling signal Si. The image signals VID1 to VID12 are simultaneously supplied from 12 image signal lines 500 to the data lines 6 belonging to the data line group through the sampling transistors 71 that are in the On state, for each data line sequentially. Accordingly, the data lines 6 belonging to one data line group are simultaneously driven. Thus, according to this embodiment, 12 data lines 6 are driven for each data line group, and accordingly, the driving frequency can be suppressed.

When the configuration of one sub pixel 70 shown in FIG. 3 is mainly considered, the data line 6 to which the image signal VIDk (here, k=1, 2, 3, . . . , 12) is supplied is electrically connected to the source electrode of the TFT 30, the scanning line 11 to which the scanning signal Yj (here, j=1, 2, 3, . . . , m) is supplied is electrically connected to the gate electrode of the TFT 30, and simultaneously, the pixel electrode 9 of the liquid crystal element 118 is electrically connected to the drain electrode of the TFT 30. Here, in each sub pixel 70, the liquid crystal element 118 is formed by pinching a liquid crystal between the pixel electrode 9 and the opposing electrode 21.

Here, in order to prevent leakage of the maintained image signal, the storage capacitor 119 is added to be parallel to the liquid crystal element 118. Owing to the storage capacitor 119, the electric potential maintaining characteristic of the pixel electrode 9a is improved. Accordingly, improvement of display characteristics such as improvement of contrast and decrease of flicker can be achieved.

The scanning lines 11 are selected one after another in accordance with the scanning signals Y1 . . . , Ym that are output from the scanning line driving circuit 104. In the sub pixel 70 corresponding to the selected scanning line 11, when a scanning signal Yj is supplied to the TFT 30, the TFT 30 is in the ON state, and accordingly, the sub pixel 70 is in the selected state. By closing the switch of the TFT 30 only for a predetermined period, the image signal VIDk is supplied from the data line 6 to the pixel electrode 9 of the liquid crystal element 118 at a predetermined timing. Accordingly, an applied voltage that is defined by the electric potentials of the pixel electrode 9 and the opposing electrode 21 is applied to the liquid crystal element 118. The alignment and order of the molecular set of the liquid crystal is changed in accordance with the applied voltage level for modulating light, and accordingly, a gray scale can be displayed.

In addition, in order to set the parasitic capacitance generated between adjacent data lines 6 to be the same for the data lines 6, the additional capacitor 120 is added to each data line 6. Accordingly, a vertical line or burnout generated due to a difference in the parasitic capacitance can be prevented. The additional capacitor 120 is disposed in the peripheral area of the image display area 10a so as not to interrupt the disposition of pixels in the image display area 10a.

Figure 4:
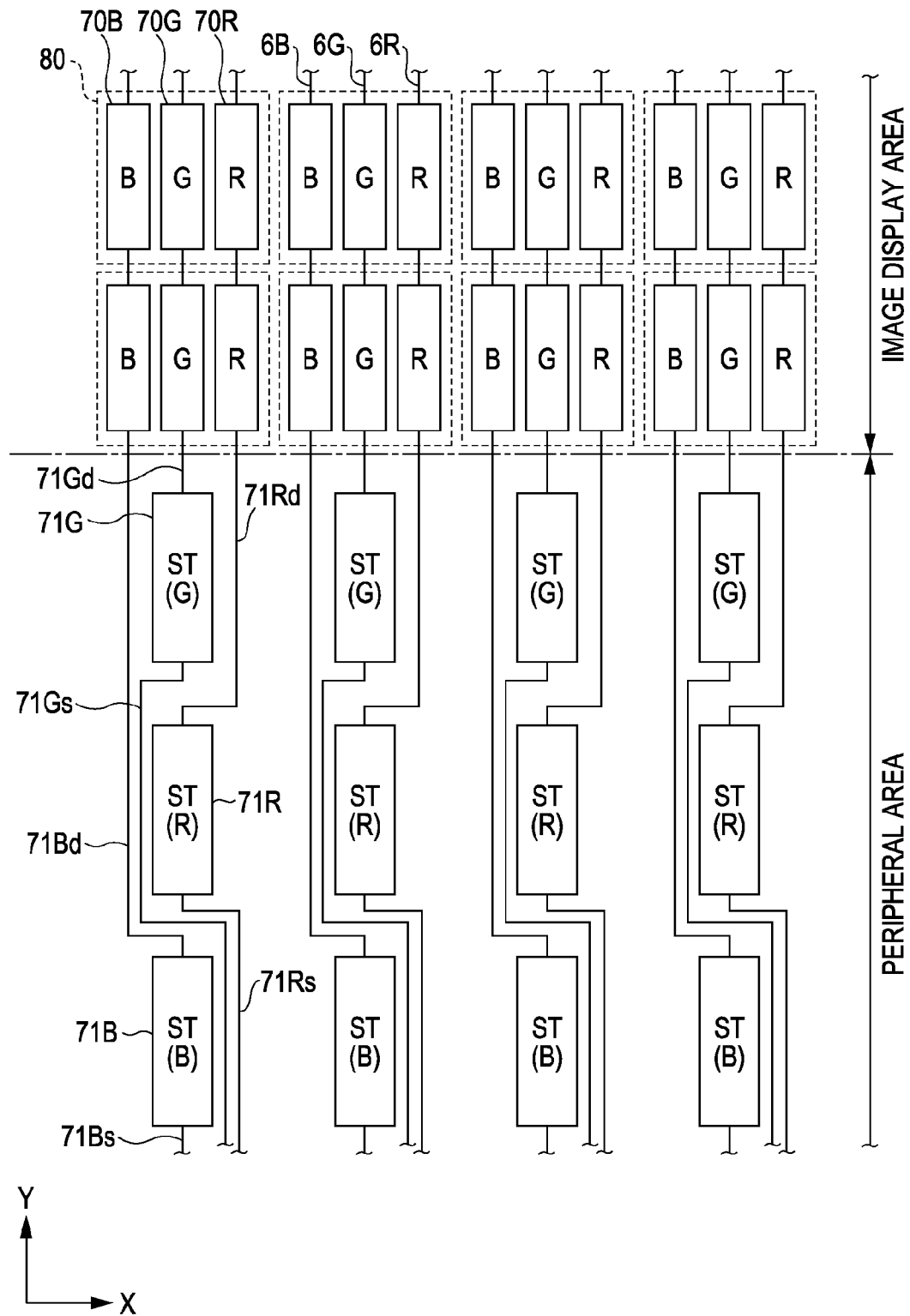
FIG. 4 is a schematic plan view showing the layout of a sampling transistor of a liquid crystal device according to an embodiment of the invention.
Figure 5:
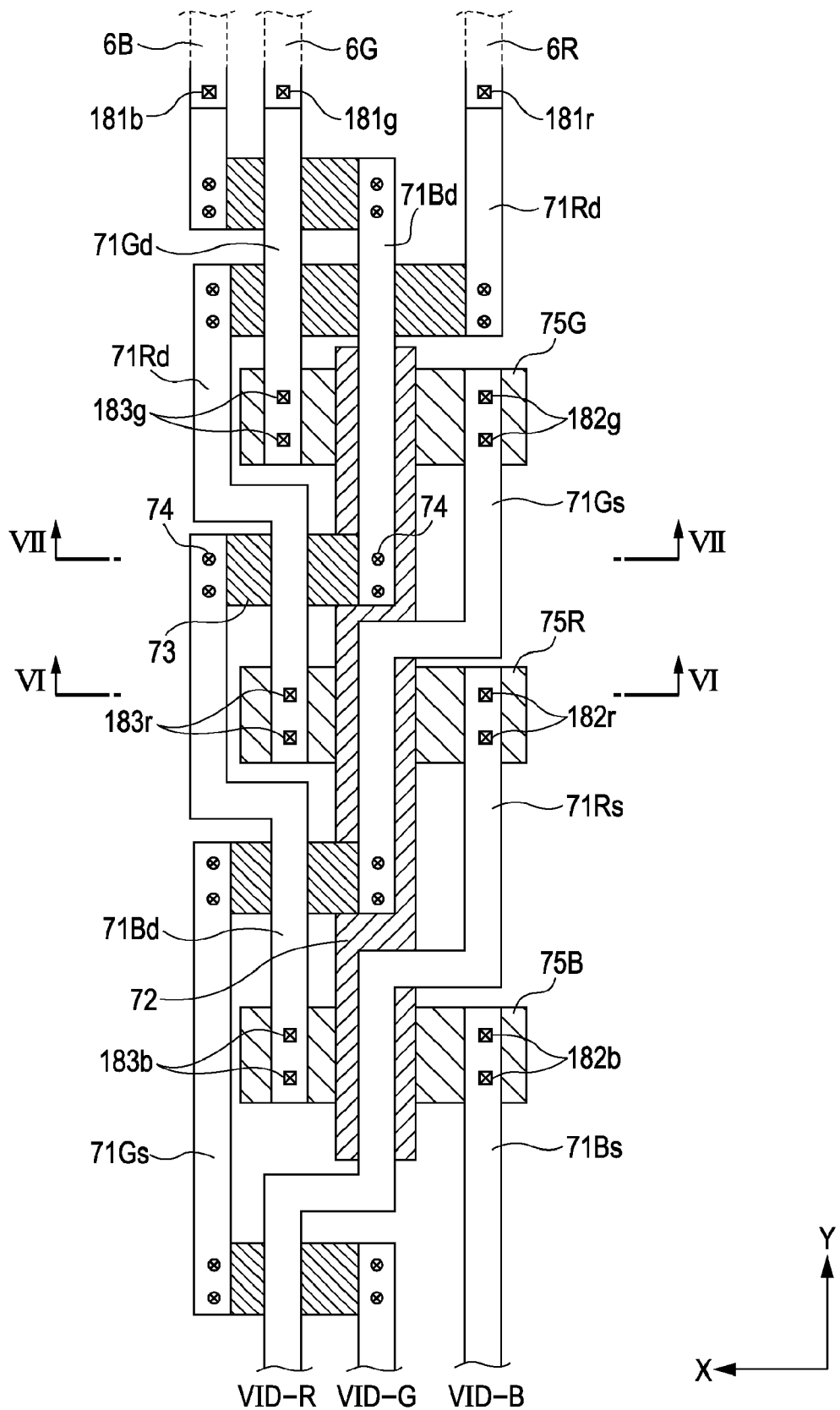
FIG. 5 is a plan view showing the wiring layout of a sampling transistor of a liquid crystal device according to an embodiment of the invention.

Next, the layout of the sampling transistor of the liquid crystal device according to this embodiment will be described. Here, FIG. 4 is a schematic plan view showing the layout of the sampling transistor of the liquid crystal device 100 according to this embodiment. FIG. 5 is a plan view showing a detailed wiring layout of the sampling transistor of the liquid crystal device according to this embodiment.

As shown in FIG. 4, a plurality of the sampling transistors 71 (that is, the sampling transistors 71R, 71G, and 71B) is arranged in direction X for each color of corresponding sub pixels 70 in the peripheral area that is located on the periphery of the image display area 10a in which the unit pixels 80 are arranged in a matrix shape and is simultaneously arranged in direction Y to be deviated for each color of corresponding sub pixels 70. In other words, a plurality of the sampling transistors 71G corresponding to the green color is arranged in direction X, a plurality of the sampling transistors 71R corresponding to the red color is arranged in direction X on a side farther than the arrangement of the plurality of the sampling transistors 71G from the image display area 10a in direction Y, and a plurality of sampling transistors 71B corresponding to the blue color is arranged in direction X on a side farther than the arrangement of the plurality of the sampling transistors 71R from the image display area 10a in direction Y. The sampling transistors 71G, 71R, and 70B corresponding to the sub pixels 70G, 70R, and 70B that constitute one unit pixel 80 are arranged in direction Y.

In other words, according to this embodiment, the plurality of the sampling transistors 71 is not arranged in one row along direction X and is arranged in three rows for the colors of the sub pixels 70 in direction X. Thus, even when the arrangement pitch of the sub pixels 70 is small, the plurality of the sampling transistors 71 can be disposed in the peripheral area in an easy manner with the size of each sampling transistor 71 acquired sufficiently.

The sampling transistors 71G, 71R, and 71B shown in FIG. 4 are formed from semiconductor layers 75R, 75G, and 75B and a common gate electrode 72 extending in direction Y as shown in FIG. 5. To the gate electrode 72, a sampling signal Si is supplied from the data line driving circuit 101 at a predetermined timing, and accordingly, the sampling transistors 71G, 71R, and 71B are simultaneously switched between the ON state and the OFF state.

The source wiring 71Gs of the sampling transistor 71G is electrically connected to the source region of the semiconductor 75G configuring the sampling transistor 71G through a contact hole 182g. The source wiring 71Gs is formed to pass through the side of the drain region of the semiconductor 75B configuring the sampling transistor 71B in direction Y after an overlapping part overlapped with the gate electrode 72 that is located on the semiconductor 75R. In addition, one end side of the source wiring 71Gs that is opposite to the other side connected to the semiconductor 75G is electrically connected to a corresponding image signal line 500, for example, through a contact hole (see FIG. 3). The drain wiring 71Gd of the sampling transistor 71G is electrically connected to the drain region of the semiconductor 75G configuring the sampling transistor 71G through a contact hole 183g. One end side of the drain wiring 71d that is opposite to the other side connected to the sampling transistor 71G is electrically connected to a corresponding data line 6G through a contact hole 181g.

The source wiring 71Rs of the sampling transistor 71R is electrically connected to the source region of the semiconductor 75R configuring the sampling transistor 71R through a contact hole 182r. The source wiring 71Rs has its one end side that is opposite to the other side connected to the sampling transistor 71R electrically connected to a corresponding image signal line 500, for example, through a contact hole (see FIG. 3) after an overlapping part that is overlapped with the gate electrode 72 located on the semiconductor 75B. The drain wiring 71Rd of the sampling transistor 71R is electrically connected to the drain region of the semiconductor 75R configuring the sampling transistor 71R through a contact hole 183r. The drain wiring 71r is formed to pass the side of the drain region of the semiconductor 75G configuring the sampling transistor 71G in direction Y. In addition, one end side of the drain wiring 71Rd that is opposite to the other side connected to the semiconductor 75R is electrically connected to a corresponding data line 6R through a contact hole 181r.

The source wiring 71Bs of the sampling transistor 71B is electrically connected to the source region of the semiconductor 75B configuring the sampling transistor 71B through a contact hole 182b. One end side of the source wiring 71Bs that is opposite to the other side connected to the semiconductor 75B is electrically connected to a corresponding image signal line 500, for example, through a contact hole (see FIG. 3). The drain wiring 71Bd of the sampling transistor 71B is electrically connected to the drain region of the semiconductor 75B configuring the sampling transistor 71B through a contact hole 183b. The drain wiring 71b is formed to pass the side of the drain region of the semiconductor 75R configuring the sampling transistor 71R in direction Y and to have a part overlapped with the gate electrode 72 located on the semiconductor 75B. In addition, one end side of the drain wiring 71b that is opposite to the other side connected to the semiconductor 75B is electrically connected to a corresponding data line 6B through a contact hole 181b.

According to this embodiment, by using the relay wiring 73 particularly, the image signal lines (the source wirings of the sampling transistor 71G and 71R and the drain wiring of the sampling transistor 71B) that are electrically connected to the source or the drain are disposed to be overlapped with one another in the plan view viewed from the TFT array substrate 10 in an area occupied by the gate electrode 72 that is commonly used by the sampling transistors 71. In other words, by disposing the electrical wirings near the transistor 71 three dimensionally by using the relay wiring 73, the layout pattern of the transistor 71, in which the image signal lines intersect one another locally, shown in FIG. 5 is implemented. Accordingly, the wirings near the transistor 71 are not needed to be drawn out to the side of the sampling transistor, and accordingly, the width of the layout pattern in direction X can be decreased. As a result, the space of the sampling circuit 71 can be saved, and accordingly, a high-quality electro-optical device corresponding to a decrease in the pixel pitch or the wiring pitch of the data lines can be achieved.

Figure 6:
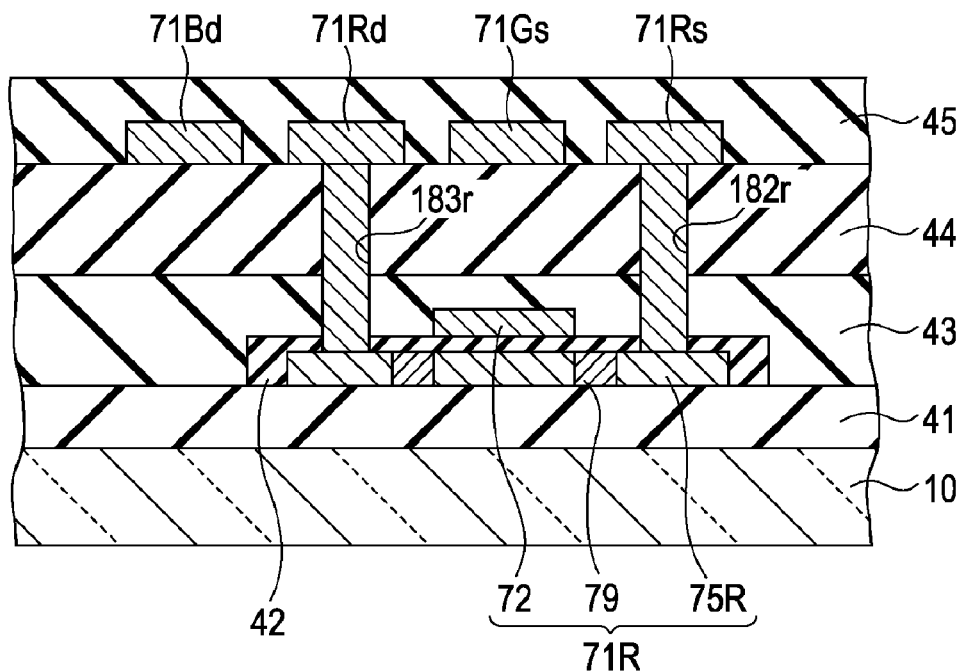
FIG. 6 is a cross-section view taken along line VI-VI shown in FIG. 5.
Figure 7:
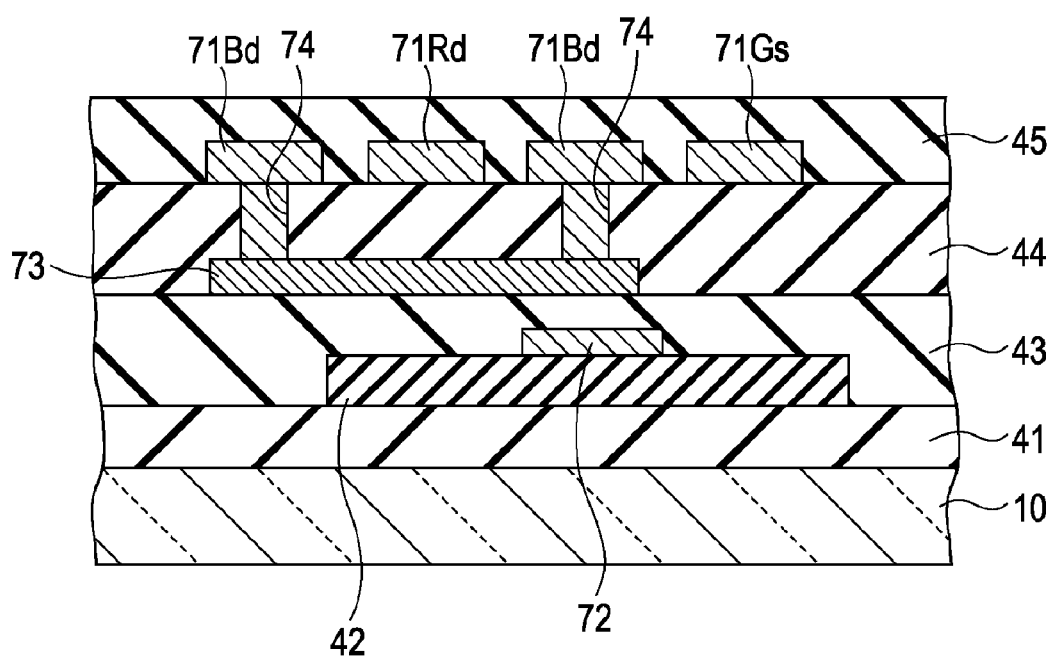
FIG. 7 is a cross-section view taken along line VII-VII shown in FIG. 5.

Next, the laminated structure of the layout pattern shown in FIG. 5 will be described in detail with reference to FIGS. 6 and 7. FIG. 6 is a cross-section view taken along line VI-VI shown in FIG. 5. FIG. 7 is a cross-section view taken along line VII-VII shown in FIG. 5.

As shown in FIG. 6, the semiconductor 75R is disposed on a base insulating film 41 that is laminated on the TFT array substrate 10. The semiconductor 75R is covered with an oxide film 42 that serves as a gate insulating film and is electrically insulated from the gate electrode 72. In addition, an LDD layer 79 may be disposed in the semiconductor 75R. The source wiring 71Rs and the drain wiring 71Rd are electrically connected to the semiconductor 75R through the contact holes 182r and 183r.

The drain wiring 71Bd of the sampling transistor 71B, the drain wiring 71Rd of the sampling transistor 71R, and the source wiring 71Gs of the sampling transistor 71G are formed of aluminum in a same layer located on interlayer insulating films 43 and 44 that are laminated so as to cover the gate electrode 72. A distance between the gate electrode 72 and the source wiring 71Gs of the sampling transistor 71G that is formed to be overlapped with the gate electrode 72 is acquired to be large by the interlayer insulating films 43 and 44. In this embodiment, for example, the distance is 800 nm. As described above, by configuring the distance between the source wiring 71Gs of the sampling transistor 71G and the gate electrode 72 to be sufficient, the parasitic capacitance among three adjacent data lines 6 can be decreased. As a result, the vertical line and the burnout due to the parasitic capacitance can be prevented in advance or can be decreased.

As shown in FIG. 7, the drain wiring 71Bd of the sampling transistor 71B, the drain wiring 71Rd of the sampling transistor 71R, and the source wiring 71Gs of the sampling transistor 71G are formed of aluminum in a same layer. Two drain wirings 71Bd shown in FIG. 7 are electrically connected to each other by being connected to the relay wiring 73 through the contact hole 74.

Next, the function and the detailed configuration of the additional capacitor 120 (see FIG. 3) that is formed in the peripheral area will be described with reference to FIGS. 8 to 10.

Figure 8:
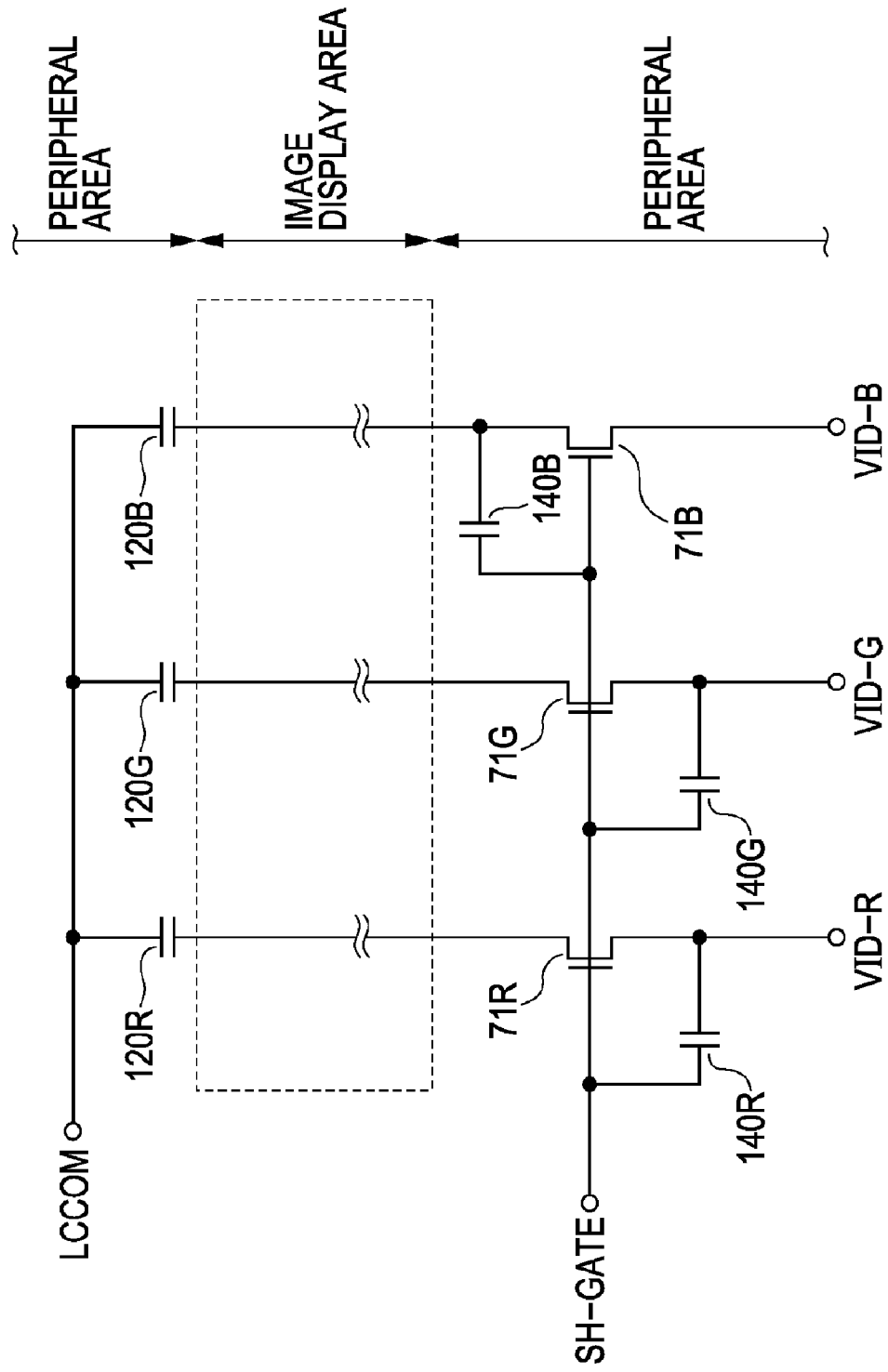
FIG. 8 is an equivalent circuit of sampling transistors and additional capacitors, in a peripheral area of an image display area, according to an embodiment of the invention.

FIG. 8 is an equivalent circuit of the sampling transistors 71 and the additional capacitors 120 in the peripheral area of the image display area. In FIG. 8, for the convenience of description, an equivalent circuit in which the pixel structure in the image display area and the like are represented in detail is omitted, and only the data lines 6 are displayed.

The parasitic capacitance 140 is parasitic capacitance among the data lines. The additional capacitors 120 are disposed for each data line 6 on a side of the peripheral area of the image display area that is opposite to a side in which the sampling circuits 71 are formed. Accordingly, the parasitic capacitance 140 of the data lines 6 is adjusted to be the same. In addition, the additional capacitors 120 are disposed on the peripheral area of the image display area 10a so as not to interrupt disposition of the pixels in the image display area 10a.

According to this embodiment, as shown in FIG. 5, the drain wiring 71Bd of the sampling transistor 71B has a part overlapped with the gate electrode 72, and the drain wirings 71Rd and 71Gd of the sampling transistors 71R and 71G do not have any part overlapped with the gate electrode 72. On the other hand, the source wiring 71Bs of the sampling transistor 71B does not have a part overlapped with the gate electrode 72, and the source wirings 71Rs and 71Gs of the sampling transistors 71R and 71G have parts overlapped with the gate electrode 72. As described above, methods of drawing out a wiring are different for the data lines 6, the data lines have parasitic capacitance 140R, 140G, and 140B that have different capacitance values.

According to research of an inventor of the invention, when the source wiring has a part overlapped with the gate electrode 72, the parasitic capacitance 140 is formed between the gate and the source. On the other hand, when the drain wiring has a part overlapped with the gate electrode 72, the parasitic capacitance 140 is formed between the gate and the drain. Accordingly, as shown in FIG. 8, the parasitic capacitance 140R and 140G is formed between the gate and the source, and only the parasitic capacitance 140B is formed between the gate and the drain.

As described above, the values of parasitic capacitance occurring in the data lines 6 are different from one another in accordance with the method of drawing out the circuits disposed on the periphery of the sampling transistors 71. Thus, by disposing the additional capacitors 120 having different capacitance values, the difference of the capacitance values for the data lines 6 is decreased.

Next, a detailed structure of the additional capacitors 120 will be described with reference to FIG. 9.

Figure 9:
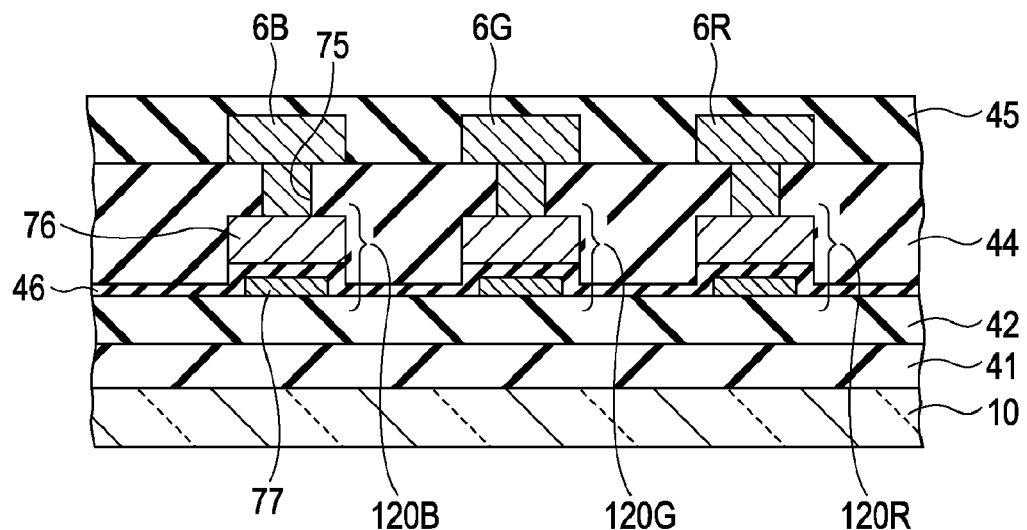
FIG. 9 is a cross-section view of an additional capacitor, in a peripheral area of an image display area, according to an embodiment of the invention.
Figure 10:
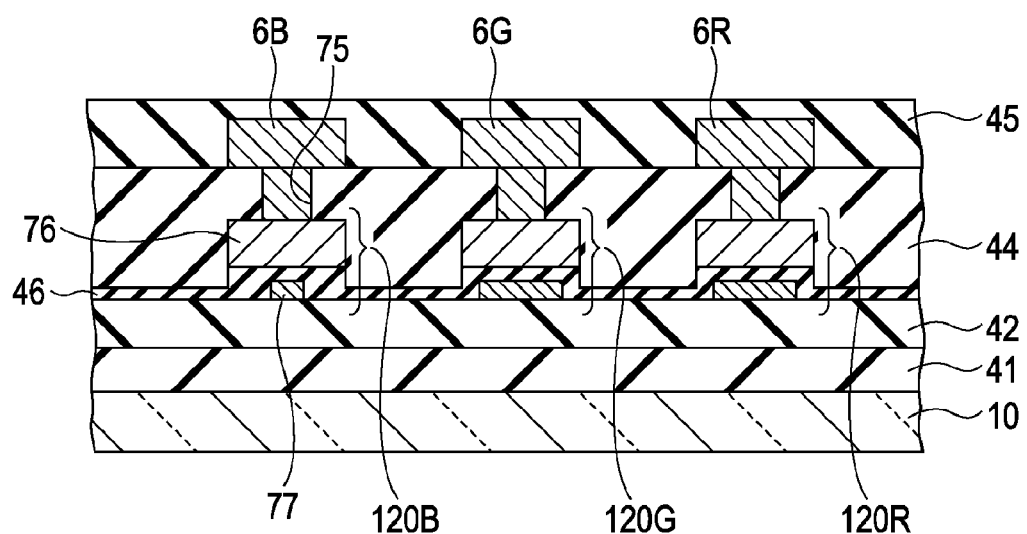
FIG. 10 is a cross-section view showing an example in which the electrode area of an additional capacitor is changed, in a peripheral area of an image display area, according to an embodiment of the invention.

As shown in FIG. 9, the additional capacitor 120 is configured by pinching a dielectric film 46 between a capacitor electrode 76 and a capacitor electrode 77. The additional capacitor 120 is disposed for each data line 6 (6R, 6G, and 6B) in the peripheral area of the image display area 10a that is disposed on a side opposite to a side on which the sampling circuit 71 is formed (see FIG. 3). The data line 6 is electrically connected to the capacitor electrode 76 though a contact hole 75. In addition, the capacitor electrode 76 is formed in a same layer as the relay wiring 73 shown in FIG. 7 and is formed of a same material, for example, aluminum, as that of the relay wiring 73. In addition, the capacitor electrode 77 is formed in a same layer as the gate electrode 72 and is formed of a same material, for example, conductive polysilicon, as that of the gate electrode 72. As described above, by processing a conductive film that is formed in the same layer, the capacitor electrode 76 can be easily formed by using a general patterning technique or the like.

The capacitance value of the additional capacitor 120 can be easily changed by changing the area of one between the capacitor electrode 76 and the capacitor electrode 77. For example, as shown in FIG. 10, by decreasing only the area of the capacitor electrode 77 corresponding to the sampling capacitor 71B, the capacitance value of the additional capacitance 120 can be decreased, compared to a case shown in FIG. 9.

As a result, by configuring the layout of the transistor circuit that implements the sampling circuit so as to include the overlapping part, high definition can be achieved, in response to a decrease in the pixel pitch or the wiring pitch of the data line 6. In addition, by adjusting the capacitance values of the additional capacitors 120 disposed for each data line such that a difference in the parasitic capacitance of the data lines 6 is decreased, it is possible to prevent or decrease the occurrence of the vertical line or the burn-in due to the difference in the parasitic capacitance. As described above, according to this embodiment, high definition can be easily achieved, and high-quality color display for a short-board-type can be performed.

Electronic Apparatus

Next, a case where a liquid crystal device as the above-described electro-optical device is applied to various electronic apparatuses will be described.

Figure 11:
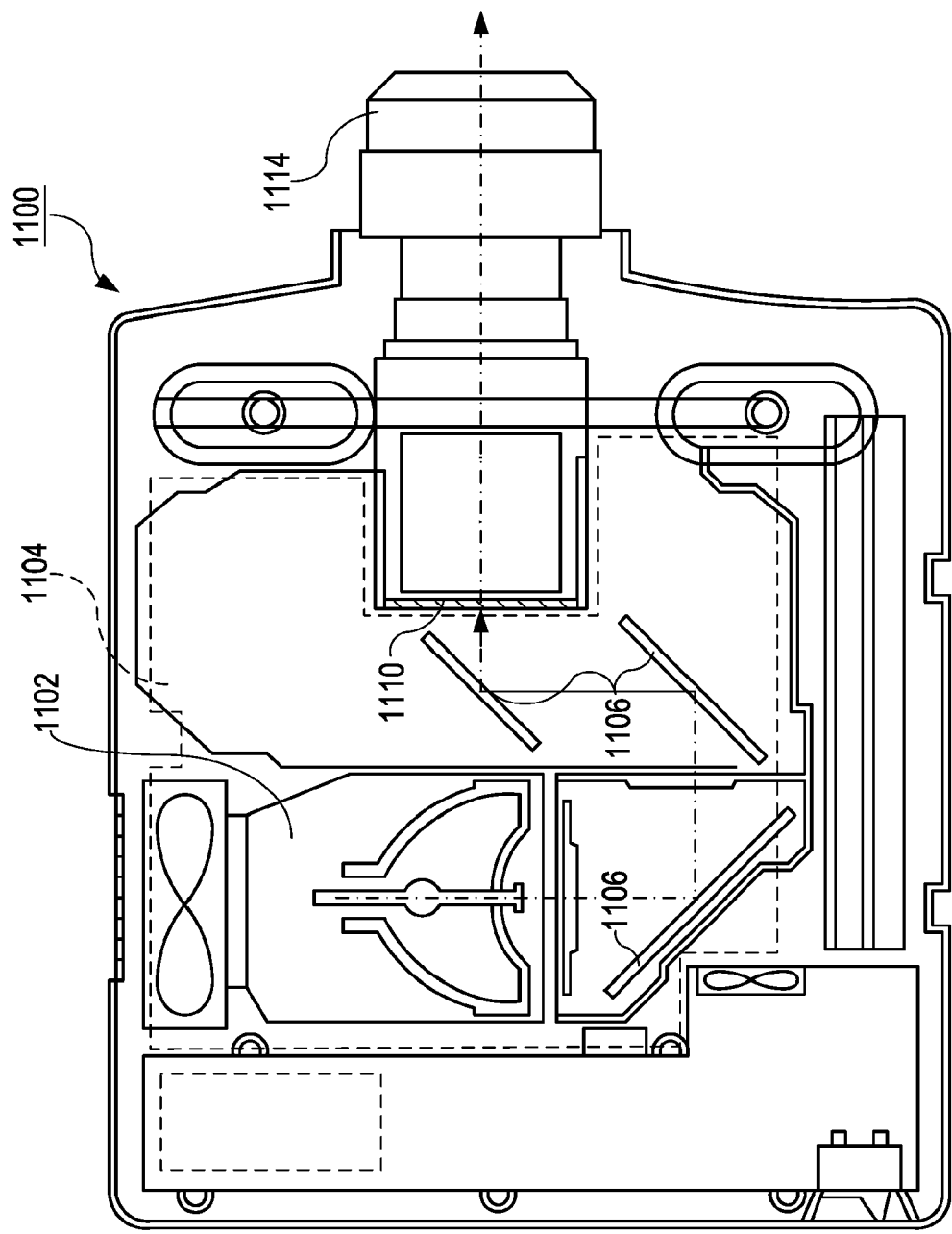
FIG. 11 is a plan view showing the configuration of a projector as an example of an electronic apparatus to which the above-described liquid crystal device is applied.

First, a projector that uses the liquid crystal device as a light valve will be described with reference to FIG. 11. FIG. 11 is a plan view showing a configuration example of the projector.

As shown in FIG. 11, inside the projector 1100, a lamp unit 1102 formed of a white light source such as a halogen lamp is disposed. The projected light emitted from the lamp unit 1102 is incident to a liquid crystal panel 1110 by three mirrors 1106 that are disposed on the inside of a light guide 1104.

The configuration of the liquid crystal panel 1110 is the same as that of the above-described liquid crystal device and is driven in accordance with image signals of RGB that are supplied from an image signal processing circuit. Then, by modulating the light by using the liquid crystal panel 1110, a displayed color image is projected onto a screen or the like through a projection lens 1114.

Figure 12:
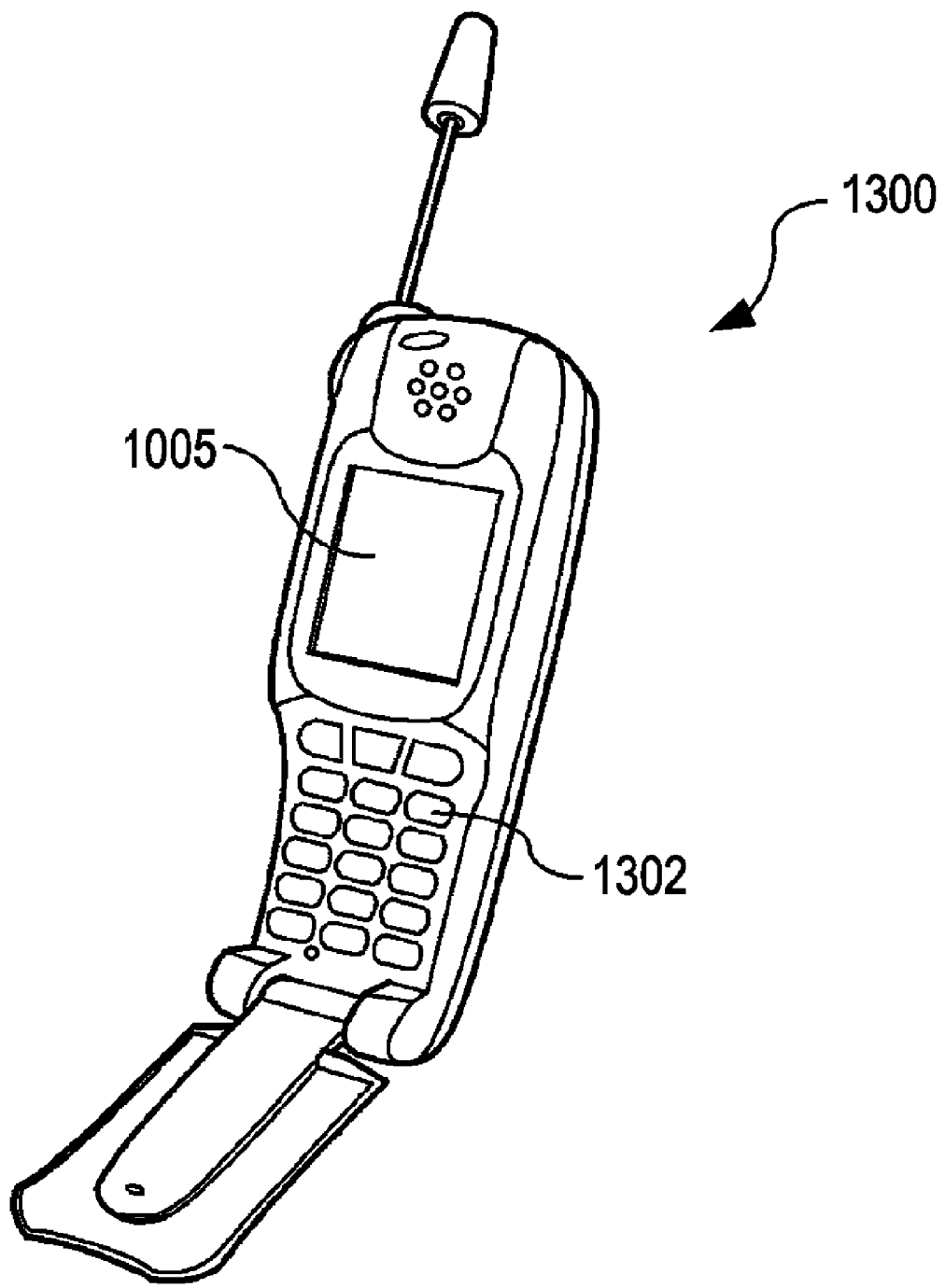
FIG. 12 is a perspective view showing the configuration of a cellular phone as an example of an electronic apparatus to which the above-described liquid crystal device is applied.

Next, a case where the above-described liquid crystal device is applied to a cellular phone will be described with reference to FIG. 12. FIG. 12 is a perspective view showing the configuration of a cellular phone.

As shown in FIG. 12, the cellular phone 1300 includes a plurality of operation buttons 1302 and a display unit 1005 to which the above-described liquid crystal device is applied.

In addition, other than the electronic apparatuses described with reference to FIGS. 11 and 12, there are a mobile-type personal computer, a liquid crystal TV, a viewfinder-type monitor, a direct viewing-type video cassette recorder, a car navigation system, a pager, an electronic organizer, a calculator, a word processor, a workstation, a video phone, a POS terminal, and an apparatus having a touch panel. It is apparent that the invention can be applied to the above-described electronic apparatuses.

In addition, the invention can be applied to a liquid crystal on silicon (LCOS) that forms an element on a silicon substrate as a reflection-type liquid crystal device, a plasma display (PDP), a field-emission type display (FED or SED), an organic EL display, a digital micro mirror device (DMD), an electrophoretic device, and the like, other than the liquid crystal device described in the embodiment as above.

The invention is not limited to the above-described embodiments and can be appropriately changed without departing from the gist or the idea that can be read out from the claims and descriptions here. Thus, an electro-optical device having such a change therein and an electronic apparatus having the electro-optical device belong to the scope of the invention, as well.

What is claimed is:

1. An electro-optical device comprising:
    a substrate;
    a scanning line provided over the substrate, the scanning line sequentially supplying scanning signals;
    three data lines for supplying image signals, the three data lines intersecting the scanning line;
    three sub pixel units aligned in a direction in correspondence with intersections of the three data lines and the scanning line, the three sub pixel units corresponding to R (red color), G (green color), and B (blue color), respectively; and
    a sampling unit for supplying the image signals to the three data lines, the sampling unit including three sampling circuits aligned in a different direction than the direction in which the three sub pixel units are aligned, the three sampling circuits corresponding to R, G, and B, respectively, and including a first sampling circuit and a second sampling circuit, the first sampling circuit including:
        a first thin film transistor having a first gate electrode, a first source, and a first drain aligned in a first direction, the first gate electrode extending in a second direction that intersects the first direction; and
        a first image signal line;
    the second sampling circuit including:
        a second thin film transistor including a second gate electrode, a second source and a second drain; and
        a second image signal line for supplying the image signals before or after sampling, the second image signal line being electrically connected to the second source or the second drain of the second thin film transistor, the second image signal line extending in the second direction across the first gate electrode and overlapping the first gate electrode in the plan view.

2. The electro-optical device according to claim 1, further comprising additional capacitors that are electrically connected to the plurality of data lines,
    wherein the additional capacitors are configured to have different capacitance values such that a difference of values of parasitic capacitance among the three adjacent data lines including a part contributed by the image signal lines electrically connected to the three adjacent data lines is decreased.

3. The electro-optical device according to claim 2,
    wherein the additional capacitors are build such that one capacitor electrode electrically connected to an opposing electrode disposed on an opposing substrate that forms a pair together with the substrate and other capacitor electrodes disposed on front ends of the plurality of data lines face each other, and
    wherein the planar sizes of the one capacitor electrode and the other capacitor electrodes are different from each other so as to decrease the difference.

4. The electro-optical device according to claim 1, wherein the image signal line for one sampling circuit of the three sampling circuits has a part that passes through a side of the thin film transistor configuring another sampling circuit of the three sampling circuits in the second direction, in the plan view viewed from the substrate.

5. The electro-optical device according to claim 4, wherein the sampling units and the image signal lines are disposed such that the passing parts pass through, as the side, a side that is located on a same side for the three sampling circuits.

6. The electro-optical device according to claim 1,
    wherein the thin film transistor is configured by laminating a channel area, a semiconductor layer including the source and the drain, a gate insulating film, and the gate electrode on the substrate in the described order, and
    wherein, on the gate electrode, one interlayer insulating film, and one conductive film that configures the image signal lines are laminated in the described order.

7. The electro-optical device according to claim 6, further comprising a relay wiring that is pinched between the one conductive film and the gate electrode through the one interlayer insulating film and another interlayer insulating film, is configured by another conductive film, and relays and connects the image signal lines.

8. An electronic apparatus comprising the electro-optical device according to claim 1.

9. An electro-optical device comprising:
    a substrate;
    a scanning line provide over the substrate, the scanning line supplying scanning signal;
    a first data line for supplying image signal;
    a second data line for supplying image signal;
    a third data line for supplying image signal;
    a first sub pixel unit in correspondence with intersection of the first data line and the scanning line, the first pixel unit corresponding to a first color;
    a second sub pixel unit in correspondence with intersection of the second data line and the scanning line, the second pixel unit corresponding to a second color that is different from the first color;
    a third sub pixel unit in correspondence with intersection of the third data line and the scanning line, the third pixel unit corresponding to a third color that is different from the first color and the second color; and
    a sampling unit for supplying the image signal to the first data line, the second data line and the third data line, the sampling unit including a first sampling circuit, a second sampling circuit and a third sampling circuit, the first sampling circuit electrically being connected to the first data line, the second sampling circuit electrically being connected to the second data line, the third sampling circuit electrically being connected to the third data line, the first sampling circuit, the second sampling circuit and the third sampling circuit being aligned in a third direction,
    the first sampling circuit including:
    a first transistor having a first gate electrode, a first source and a first drain aligned in a forth direction crossing the third direction, the first gate electrode extending in the third direction; and
    a first drain line being electrically connected to the first drain and the first data line and having a first portion extending in the third direction, the second sampling circuit including:
a second transistor having a second gate electrode, a second source and a second drain aligned in the fourth direction, the second gate electrode extending in the third direction; and
a second source line being electrically connected to the second source line and having a second portion extending in the third direction, and
at least a part of the first portion overlapping the second gate electrode.

10. The electro-optical device according to claim 9,
the third sampling circuit including:
a third transistor having a third gate electrode, a third source and a third drain aligned in the fourth direction, the third gate electrode extending in the third direction, and
at least a part of the second portion overlapping the third gate electrode.

* * * * *